United States Patent Office 3,114,763
Patented Dec. 17, 1963

3,114,763
ORGANO-SUBSTITUTED MONOFLUOROMALONO-
NITRILES AND THEIR PREPARATION
Alden D. Josey, Wilmington, Del., assignor to E. I. du Pont de Nemours and Company, Wilmington, Del., a corporation of Delaware
No Drawing. Filed Jan. 20, 1960, Ser. No. 3,511
20 Claims. (Cl. 260—465)

This invention relates to a new class of dinitriles and to a process for preparing them. More particularly this invention relates to new monofluorodinitriles and their preparation.

Nitriles, particularly dinitriles, containing halogens are difficult to prepare by conventional methods and, perhaps for this reason, this class of compounds has been investigated only to a limited extent. Chlorine and bromine-bearing malononitriles are known and they are, in general, compounds which have poor stability in the presence of water or basic reagents. Straight chain perfluorodinitriles are also known which have from two to four difluoromethylene groups separating the cyanogen radicals, i.e., the compounds have one and only one cyano group on each terminal carbon atom. No fluorine-bearing dinitriles are known which have two cyano groups and one fluorine atom bonded to the same carbon atom, i.e., fluorine-bearing malononitriles. It is to this unknown class of compounds that this invention is directed.

It is an object of this invention to provide a new class of dinitriles and a process for their preparation. A further object is to provide novel monofluorodinitriles and a process for their preparation. Further objects will appear hereinafter.

These and other objects of this invention are accomplished by providing new organo-substituted monofluoromalononitriles, i.e., compounds which have as a characteristic group a carbon atom bonded to two cyano groups, a fluorine atom, and a monovalent organic group which is free of substituents which are reactive with an alkali metal.

This new class of compounds can be represented by the following generic formula:

where R is a monovalent organic group which is free of substituents reactive with alkali metals and which is bonded through carbon to the fluoromalononitrile moiety, i.e., the R—C bond is a carbon-to-carbon bond. Preferably, R is (1) an unsubstituted hydrocarbon group, (2) a substituted hydrocarbon group in which the substituents are hydrocarbyloxy groups (R′O—) or tertiary amine groups (R″$_2$N—), i.e., dihydrocarbylamino groups, wherein the radicals R′ and R″ bonded respectively to the oxygen and to the nitrogen are hydrocarbon, or (3) a halogen-bearing carbocyclic aromatic group wherein the halogens are of atomic number 9 to 35. In an especially preferred form of the invention the total number of carbons in the group R, i.e., in the hydrocarbon, substituted hydrocarbon or halogen-bearing carbocyclic aromatic group, is at most 24.

The groups, R, R′ and R″, can be open chain or closed chain, or a combination of open and closed chains. These groups can be aliphatically saturated or unsaturated; they can be aliphatic, such as alkyl and alkenyl, or cycloaliphatic, aryl, alkaryl or aralkyl. The groups preferably contain at most one acyclic or non-benzenoid carbon-to-carbon double bond, i.e. ethylenic double bond, and are free of carbons joined by triple bonds, i.e., free of acetylenic unsaturation.

The following examples are illustrative of the group R: methyl, propyl, isopropyl, octyl, 2-ethylhexyl, dodecyl, octadecyl, octenyl, cyclopropyl, cyclohexyl 4-allylcyclohexyl cyclohexenyl, 4-methylcyclohexenyl, tolyl, diphenyl, naphtyl, anthryl, p-methylbenzyl, p-octylphenyl, p-dodecylphenyl, diethylaminoethyl, 4-dipropylaminocyclohexyl, p-dimethylaminophenyl, ethoxyethyl, butoxyethyl, o-methoxyphenyl, p-ethoxyphenyl, 8-isopropoxynaphthyl, p-fluorophenyl, 2,4-difluorophenyl, p-chlorophenyl, 2,4-dibromophenyl, and the like.

The toxicity of the new compounds has not been established. Inhalation of the vapors of the compounds and prolonged contact with the skin should be avoided.

The new compounds normally are colorless liquids or white solids which are stable under ordinary conditions of temperature and pressure. They can be stored safely for prolonged periods in containers made of conventional corrosion-resistant materials, e.g., glass, stainless steel, poly(tetrafluoroethylene)resin, polyethylene, and the like. The compounds show good thermal stability and they can be distilled, generally under reduced pressure, without decomposition. They are insoluble in water and they will, if maintained in contact with water, react slowly to form fluorine-containing amides. The fluoromalononitriles are soluble in conventional non-hydroxylated organic solvents, including ether, ethyl acetate, acetone, methyl ethyl ketone, N,N-dimethylformamide, tetrahydrofuran, and the like. The new compounds are also soluble in aromatic hydrocarbons, e.g., benzene, xylene, and the like. The compounds react with hydroxyl-bearing reagents, e.g., methanol and ethanol, and such reagents are, preferably, not used as solvents.

This new class of compounds possesses unusual and valuable properties as solvents and reactive intermediates.

The compounds of the invention are prepared by reacting perchloryl fluoride (ClO$_3$F) with an organo-substituted malononitrile, i.e., a compound of the general structure RCH(CN)$_2$, where R has the meaning given in the earlier paragraphs wherein the compounds of the invention are defined.

The reaction may be conducted by several methods. In one mode of operation, the reactants may be mixed directly, i.e., perchloryl fluoride can be passed into the organo-substituted malononitrile which, optionally, is in solution in an inert solvent. Yields of desired products obtained by this process are generally improved by having a hydrogen fluoride acceptor present during the reaction. In this modification, the hydrogen fluoride acceptor, generally an alkali metal fluoride, and the organo-substituted malononitrile are intimately mixed in an inert liquid medium and the perchloryl fluoride is added to the mixture.

In a second mode of operation, the organo-substituted malononitrile is converted to an alkali metal derivative by reaction, e.g., with an alkali metal or its hydride. The alkali metal derivative is then reacted with perchloryl fluoride to obtain the organo-substituted fluoro-malononitrile. This method of operation generally provides good yields of the desired product and it is therefore a preferred method.

The reaction is generally conducted in an inert solvent, e.g., an ether. Isolation of the intermediate obtained in the reaction, i.e., the alkali metal derivative of the organo-substituted malononitrile, prior to reaction with perchloryl fluoride is not essential.

The reactants employed in the process are commercially available materials or they are prepared by methods described in the literature. Perchloryl fluoride, alkali metals and hydrides or fluorides of alkali metals are available compounds. Organo-substituted malononitriles are a known class of compounds which can be prepared by a number of methods. A generally applicable procedure consists in dehydrating an organo-substituted cyanoacetamide or an organo-substituted malonamide with phosphorus pentoxide. Specific methods of preparation are given in Wagner and Zook, "Synthetic Organic Chemistry," p. 614, John Wiley & Sons, Inc., N.Y. (1953) and by Westfahl and Gresham, J. Am. Chem. Soc. 76, 1076 (1954).

The preferred hydrogen fluoride acceptors for use in the process are sodium fluoride and potassium fluoride. Sodium fluoride is especially preferred.

The preferred alkali metals for preparation of intermediates in the reaction are sodium and potassium or their hydrides, i.e., sodium and potassium hydrides. Sodium hydride is especially preferred in view of its commercial availability. Sodium hydride is conveniently employed in the form of a dispersion or suspension in light mineral oil or kerosene. The dispersion medium is unreactive in the process.

Any conventional reaction vessel can be employed which is equipped with means for agitating the reactants, for cooling or heating the vessel and for admitting the gaseous reactant, perchloryl fluoride. In one preferred procedure, the vessel is charged with a suspension of the alkali metal reactant in an inert reaction medium and a solution of the substituted malononitrile is added portion-wise with vigorous stirring to this suspension. This phase of the process is conducted at prevailing atmospheric temperature, i.e., room temperature (15-30° C.) The mixture is stirred until it is clear and it is then cooled by suitable means to 0° C. or lower. Agitation and cooling of the reaction mixture is maintained while perchloryl fluoride is passed into the mixture until the acidity of the mixture is close to neutral or, expressed as pH, is 6-8. The pH value of the mixture is determined by well-known methods, e.g., test papers, solvent-soluble indicators or direct potentiometric measurements. Flow of perchloryl fluoride is stopped when the desired pH value has been reached and the mixture is agitated for a period of time to assure completion of the reaction. Alkali metal chlorate is obtained as a by-product and it is insoluble in the reaction mixture.

The alkali metal chlorate is separated from the liquid mixture by conventional methods, e.g., filtration or decantation. Suitable precautions must be taken in handling the alkali metal chlorate in view of its known hazards. The filtrate which contains the organo-substituted fluoromalononitrile is subjected to fractional distillation to obtain the desired reaction product. Optionally, a major portion of the solvent can be removed from the product by simple evaporation prior to fractional distillation. The product can be further purified, if desired, by fractional crystallization, chromatography or other well-known procedures.

The molar ratio in which the reactants are used is not critical. For maximum yield of fluoromalononitrile equimolar ratios of the reactants are employed although such ratios are not essential for operability. In the preferred procedure, the molar ratio of alkali metal (or its equivalent) to the organo-substituted malononitrile will lie between 0.5 and 1.5 and the molar ratio of perchloryl fluoride to organo-substituted malononitrile will be within the same range, i.e., 0.5-1.5. For optimum yield of the fluoromalononitriles, the alkali metal hydride and organo-substituted malononitrile are used in equimolar ratios and a slight excess of perchloryl fluoride is employed.

The solvents employed are inert to alkali metals and to perchloryl fluoride. Ethers are a preferred class of solvents, e.g., diethyl ether, di-n-butyl ether, tetrahydrofuran, 1,2-diethoxyethane, anisole, phenetole and the like. Hydrocarbons can also be used as reaction media, e.g., benzene, cyclohexane, decahydronaphthalene, and the like. The quantity of solvent which is used is a matter of convenience. Generally, sufficient solvent is used to permit easy agitation of the reaction mixture.

The reaction generally proceeds rapidly and elevated temperatures are normally not required. However, heat can be supplied in the process to bring to completion the reaction of a slow-reacting component, e.g., long chain hydrocarbon-substituted malononitriles. The temperature of the reaction will generally lie between about —50° and 150° C., preferably between about —20° and 100° C.

The following examples in which parts are expressed by weight, illustrate the preparation of the compounds of the invention.

Example I

A glass reaction vessel, equipped with a mechanical stirrer, gas inlet tube and reflux condenser, is charged with approximately 110 parts of 1,2-dimethoxyethane and 4.67 parts of a 51.2% dispersion of sodium hydride in mineral oil. The mixture is stirred and a solution of 9.4 parts of ethylmalononitrile in 20-25 parts of 1,2-dimethoxyethane is added. The reaction mixture is stirred until it becomes clear and the solution is then cooled to —10° C. by immersing the reaction vessel in a solid carbon dioxide-acetone mixture. Perchloryl fluoride gas is passed into the reaction mixture with vigorous stirring until the pH of the solution is 6-8, as determined by standard test papers. Flow of perchloryl fluoride is stopped and the mixture is stirred for 5 minutes. The reaction mixture is filtered and the filtrate is evaporated under reduced pressure to remove the solvent. The liquid residue is distilled through an efficient fractionating column to obtain 5.11 parts of ethylfluoromalononitrile, a colorless liquid which boils at 73-74° C./200 mm. mercury pressure. The compound has the formula $$C_2H_5CF(CN)_2$$

The identity of the compound is confirmed by the nuclear magnetic resonance and infrared spectra.

Example I illustrates the invention with respect to organo-substituted fluoromalononitriles in which the organic substituent is non-benzenoid in character. Thus, by using the process of Example I, methylfluoromalononitrile is obtained from methylmalononitrile, dodecylfluoromalononitrile is obtained from dodecylmalononitrile and cyclopentylfluoromalononitrile is obtained from cyclopentylmalononitrile. In a similar manner, isobutylfluoromalononitrile, octadecylfluoromalononitrile, ethoxyethylfluoromalononitrile and diethylaminoethylfluoromalononitrile are obtained from the appropriate malononitriles.

Example II

A glass reaction vessel of the type described in Example I is charged with approximately 85 parts of 1,2-dimethoxyethane and 4.67 parts of sodium hydride (51.2% dispersion in mineral oil). A solution of 14.2 parts of phenylmalononitrile in 20-25 parts of 1,2-dimethoxyethane is added with agitation and the reaction mixture is stirred until it is clear. The solution is cooled to about —10° C. by immersing the reaction vessel in a solid carbon dioxide-acetone bath. Perchloryl fluoride gas is passed into the reaction mixture until the pH of the solution is 6-8. Flow of perchloryl fluoride is discontinued and the reaction mixture is stirred for 5 minutes. The mixture is filtered and the filtrate is evaporated under reduced pressure to remove the solvent. The liquid residue is distilled through an efficient fractionating column to obtain 11.2 parts of phenylfluoromalononitrile, a clear liquid, boiling at 71° C./11 mm. The compound has the formula $C_6H_5CF(CN)_2$.

*Anal.*—Calc'd for $C_9H_5FN_2$: C, 67.49; H, 3.15; N, 17.50; F, 11.87. Found: C, 67.83; H, 3.63; N, 17.74; F, 11.63.

Example II illustrates the invention with respect to aromatic carbocyclic-substituted fluoromalononitriles. By using the process of Example II, p-tolylfluoromalononitrile is obtained from p-tolylmalononitrile, 4-biphenylfluoromalononitrile is obtained from 4-biphenylmalononitrile, p-octadecylphenylfluoromalononitrile is obtained from p- octadecylphenylmalononitrile and 2-naphthylfluoromalononitrile is obtained from 2-naphthylmalononitrile.

By using the procedure of Example II and the appropriately substituted malononitrile, there can be obtained p-chlorophenylfluoromalononitrile, p-fluorophenylfluoromalononitrile, 2,4-dichlorophenylfluoromalononitrile, o-methoxyphenylfluoromalononitrile, p-dimethylaminophenylfluoromalononitrile, and the like.

*Example III*

Using the procedure described in Example I, a solution of 30.8 parts of benzylmalononitrile in 200 parts of 1,2-dimethoxyethane is reacted with 9.36 parts of sodium hydride (51.2% dispersion in mineral oil). After stirring and cooling, as described in Example I, perchloryl fluoride is passed into the solution until the pH is 6–8. There is obtained from the reaction mixture 21.3 parts of benzylfluoromalononitrile, boiling at 50–51° C./2 mm. mercury pressure; M.P. 49–50° C. The compound which is a white, crystalline solid, has the formula $$C_6H_5CH_2CF(CN)_2$$

*Anal.*—Calc'd for $C_{10}H_7FN_2$: C, 68.94; H, 4.06; F, 10.91; N, 16.08. Found: C, 69.02; H, 4.47; F, 10.67; N, 15.22.

Benzylfluoromalononitrile, boiling at 64° C./4 mm. is obtained when 15.4 parts of benzylmalononitrile, 4.67 parts of a 51.2% dispersion of sodium hydride in mineral oil are reacted with perchloryl fluoride in solution in 1,2-dimethoxyethane as described in Example III.

Example III illustrates the invention with respect to organo-substituted fluoromalononitriles in which the organic substituent is a combination of aromatic carbocyclic and aliphatic hydrocarbon groups. By using the process of Example III, p-methylbenzylfluoromalononitrile is obtained from p-methylbenzylmalononitrile, alpha-naphthylmethylfluoromalononitrile is obtained from alpha-naphthylmethylmalononitrile, (2-phenylethyl)fluoromalononitrile is obtained from (2-phenylethyl)malononitrile, and p-methoxybenzylfluoromalononitrile is obtained from p-methoxybenzylmalononitrile.

*Example IV*

A reaction vessel of the type described in Example I is flushed with nitrogen and it is then charged with 8.4 parts of sodium fluoride and about 85 parts of 1,2-dimethoxyethane. The mixture is agitated and a solution of 14.2 parts of phenylmalononitrile in about 22 parts of 1,2-dimethoxyethane is added in one portion. The white suspension is agitated and cooled to about −10° C. by means of a solid carbon dioxide-trichloroethylene mixture. Perchloryl fluoride is passed into the suspension at such a rate that very little of the fluoride leaves in the effluent gas. After 2 hours the temperature is allowed to rise to 5° C. and the reaction mixture is maintained at this temperature for 1.5 hours. Flow of perchloryl fluoride is then discontinued and the reaction mass is again cooled to −10° C. It is stirred for 1 hour and then filtered. The pale yellow filtrate is concentrated under reduced pressure to remove the solvent. There remains a mixture of oil and crystals from which the oil is decanted. The oil is distilled through an efficient fractionating column to yield 2.85 parts of phenylfluoromalononitrile, B.P. 75–76° C./11–13 mm.

Example IV illustrates the operation of the process of the invention employing a hydrogen fluoride acceptor. This procedure can be used to prepare other organo-substituted fluoromalononitriles, e.g., p-isopropyl-phenylfluoromalononitrile from p-isopropylphenylmalononitrile and 4-ethylcyclohexylfluoromalononitrile from 4-ethylcyclohexylmalononitrile. Potassium fluoride can be also used as the hydrogen fluoride acceptor in the process.

The new compounds are hydrolytically stable materials. They do not lose fluorine when brought into contact with water for prolonged periods. The compounds may react slowly with water to form amides but they do not release free fluoride ions. In contrast, chloro- and bromomalononitriles are easily hydrolyzed.

The new compounds react with liquid ammonia to form fluorine-containing polymers which are composed of s-triazine rings. Fluorine is not lost in this reaction but is carried through unchanged into the polymer. The polymeric products can be molded into useful forms, e.g., liners for bottle caps and the like.

The compounds of the invention are generically useful as latent solvents for coalescing powdered polymeric products into films, e.g., polyacrylonitrile powder or poly(vinyl chloride) powder. To illustrate, 2 parts of powdered poly(vinyl chloride) was mixed with 1 part of benzylfluoromalononitrile to form a plastisol. The plastisol was warmed gently on a glass surface and the mixture coalesced rapidly to form a clear film. Continued warming of the coalesced film resulted in volatilization of the fluoromalononitrile and there remained a clear tough film of poly(vinyl chloride). Similarly good results are obtained with other hydrocarbon-substituted fluoromalononitriles, e.g., phenylfluoromalononitrile.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An organo-substituted monofluoromalononitrile having the formula

wherein R is a monovalent organic radical of at most 24 carbons having at most one non-benzenoid carbon-to-carbon multiple bond, and that being ethylenic, said radical being selected from the group consisting of
   (a) hydrocarbon radicals,
   (b) substituted hydrocarbon radicals having as the sole substituent one alkoxy group,
   (c) substituted hydrocarbon radicals having as the sole substituent one dialkylamino group, and
   (d) substituted carbocyclic aromatic radicals having as the sole substituents at most two halogens of atomic number 9 to 35.

2. An organo-substituted monofluoromalononitrile having the formula

where R is a monovalent aliphatically saturated hydrocarbon radical of at most 24 carbons.

3. An organo-substituted monofluoromalononitrile having the formula

where R is a substituted monovalent aliphatically saturated hydrocarbon radical of at most 24 carbons having as the sole substituent one alkoxy group.

4. An organo-substituted monofluoromalononitrile having the formula

where R is a substituted monovalent aliphatically saturated hydrocarbon radical of at most 24 carbons having as the sole substituent one dialkylamino group.

5. An organo-substituted monofluoromalononitrile having the formula

where R is a substituted carbocyclic aromatic radical of at most 24 carbons having as the sole substituents at most two halogens of atomic number 9 to 35.

6. An organo-substituted monofluoromalononitrile having the formula

where R is alkyl of at most 24 carbons.

7. An organo-substituted monofluoromalononitrile having the formula

where R is aryl of at most 24 carbons.

8. An organo-substituted monofluoromalononitrile having the formula

where R is aralkyl of at most 24 carbons.

9. Process for the preparation of an organo-substituted monofluoromalononitrile which comprises contacting and reacting at a temperature within the range of −50° C. to 150° C., perchloryl fluoride with an organo-substituted malononitrile having the formula RCH(CN)$_2$, where R is a monovalent organic radical of at most 24 carbons having at most one non-benzenoid carbon-to-carbon multiple bond, and that being ethylenic, said radical being selected from the group consisting of
 (a) hydrocarbon radicals,
 (b) substituted hydrocarbon radicals having as the sole substituent one alkoxy group,
 (c) substituted hydrocarbon radicals having as the sole substituent one dialkylamino group, and
 (d) substituted carbocyclic aromatic radicals having as the sole substituents at most two halogens of atomic number 9 to 35.

10. Process for the preparation of an organo-substituted monofluoromalononitrile which comprises contacting and reacting, at a temperature within the range of −50° C. to 150° C., in an inert solvent and in the presence of a substance selected from the group consisting of alkali metals, alkali metal hydrides, and alkali metal fluorides, perchloryl fluoride with an organo-substituted malononitrile having the formula RCH(CN)$_2$, where R is a monovalent organic radical of at most 24 carbons having at most one non-benzenoid carbon-to-carbon multiple bond, and that being ethylenic, said radical being selected from the group consisting of
 (a) hydrocarbon radicals,
 (b) substituted hydrocarbon radicals having as the sole substituent one alkoxy group,
 (c) substituted hydrocarbon radicals having as the sole substituent one dialkylamino group, and
 (d) substituted carbocyclic aromatic radicals having as the sole substituents at most two halogens of atomic number 9 to 35.

11. Process for the preparation of an organo-substituted monofluoromalononitrile which comprises contacting and reacting, at a temperature within the range of −50° C. to 150° C., in an inert solvent, perchloryl fluoride with an alkali metal derivative of an organo-substituted malononitrile having the formula RCH(CN)$_2$, where R is a monovalent organic radical of at most 24 carbons having at most one non-benzenoid carbon-to-carbon multiple bond, and that being ethylenic, said radical being selected from the group consisting of
 (a) hydrocarbon radicals,
 (b) substituted hydrocarbon radicals having as the sole substituent one alkoxy group,
 (c) substituted hydrocarbon radicals having as the sole substituent one dialkylamino group, and
 (d) substituted carbocyclic aromatic radicals having as the sole substituents at most two halogens of atomic number 9 to 35.

12. Process for the preparation of an alkyl-substituted monofluoromalononitrile which comprises contacting and reacting, at a temperature within the range of −50° C. to 150° C., in an inert solvent, perchloryl fluoride with an alkali metal derivative of an alkyl-substituted malononitrile having the formula RCH(CN)$_2$, where R is alkyl of at most 24 carbons.

13. Process for the preparation of an aryl-substituted monofluoromalononitrile which comprises contacting and reacting, at a temperature within the range of −50° C. to 150° C., in an inert solvent, perchloryl fluoride with an alkali metal derivative of an aryl-substituted malononitrile having the formula RCH(CN)$_2$, where R is aryl of at most 24 carbons.

14. Process for the preparation of an aralkyl-substituted monofluoromalononitrile which comprises contacting and reacting, at a temperature within the range of −50° C. to 150° C., in an inert solvent, perchloryl fluoride with an alkali metal derivative of an aralkyl-substituted malononitrile having the formula RCH(CN)$_2$, where R is aralkyl of at most 24 carbons.

15. Process for the preparation of an aryl-substituted monofluoromalononitrile which comprises contacting and reacting, at a temperature within the range of −50° C. to 150° C., in an inert solvent and in the presence of an alkali metal fluoride, perchloryl fluoride with an aryl-substituted malononitrile having the formula RCH(CN)$_2$, where R is aryl of at most 24 carbons.

16. Ethylfluoromalononitrile.

17. Phenylfluoromalononitrile.

18. Benzylfluoromalononitrile.

19. Process for the preparation of ethylfluoromalononitrile which comprises contacting and reacting, at a temperature within the range of −50° C. to 150° C., ethylmalononitrile in an inert solvent with perchloryl fluoride in the presence of an alkali metal hydride.

20. Process for the preparation of phenylfluoromalononitrile which comprises contacting and reacting, at a temperature within the range of −50° C. to 150° C., phenylmalononitrile in an inert solvent with perchloryl fluoride in the presence of a substance selected from the group consisting of alkali metals, alkali metal hydrides and alkali metal fluorides.

References Cited in the file of this patent

UNITED STATES PATENTS

| 2,774,783 | Ardis | Dec. 18, 1956 |
|---|---|---|
| 2,788,360 | Westfahl | Apr. 9, 1957 |